United States Patent
Jones et al.

(10) Patent No.: US 7,593,414 B2
(45) Date of Patent: Sep. 22, 2009

(54) ENHANCED CSU/DSU (CHANNEL SERVICE UNIT/DATA SERVICE UNIT) FOR FRAME RELAY OVER DSL

(75) Inventors: Kenneth Roger Jones, Cool, CA (US); Brian A. Gonsalves, Antioch, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 876 days.

(21) Appl. No.: 10/654,861

(22) Filed: Sep. 4, 2003

(65) Prior Publication Data
US 2005/0053001 A1    Mar. 10, 2005

(51) Int. Cl.
H04L 12/56    (2006.01)

(52) U.S. Cl. .................. 370/401; 370/235; 370/466

(58) Field of Classification Search .......... 370/235, 370/395.1, 395.3, 395.5, 395.6, 395.61, 395.63, 370/396–399, 400–401, 465–466, 469, 352–356
See application file for complete search history.

(56) References Cited

U.S. PATENT DOCUMENTS

| | | | | |
|---|---|---|---|---|
| 5,469,353 | A * | 11/1995 | Pinsky et al. | 382/131 |
| 5,896,383 | A * | 4/1999 | Wakeland | 370/400 |
| 5,970,069 | A * | 10/1999 | Kumar et al. | 370/402 |
| 6,047,002 | A * | 4/2000 | Hartmann et al. | 370/466 |
| 6,271,845 | B1 * | 8/2001 | Richardson | 715/764 |
| 6,272,127 | B1 | 8/2001 | Golden et al. | |
| 6,351,452 | B1 * | 2/2002 | Koenig et al. | 370/217 |
| 6,370,152 | B1 * | 4/2002 | Schofield et al. | 370/432 |
| 6,389,464 | B1 | 5/2002 | Krishnamurthy et al. | |
| 6,421,319 | B1 | 7/2002 | Iwasaki | |
| 6,430,273 | B1 | 8/2002 | Shaheen | |
| 6,430,619 | B1 | 8/2002 | Sitaraman et al. | |
| 6,445,682 | B1 | 9/2002 | Weitz | |
| 6,452,923 | B1 * | 9/2002 | Gerszberg et al. | 370/352 |
| 6,453,016 | B1 | 9/2002 | Chea, Jr. | |
| 6,477,579 | B1 | 11/2002 | Kunkel et al. | |
| 6,498,791 | B2 | 12/2002 | Pickett et al. | |
| 6,510,152 | B1 | 1/2003 | Gerszberg et al. | |
| 6,526,581 | B1 | 2/2003 | Edson | |
| 6,553,489 | B1 | 4/2003 | Osler et al. | |
| 6,559,769 | B2 | 5/2003 | Anthony et al. | |
| 6,560,222 | B1 | 5/2003 | Pounds et al. | |
| 6,584,502 | B1 | 6/2003 | Natarajan et al. | |
| 6,594,695 | B1 | 7/2003 | Vasamsetti et al. | |

(Continued)

OTHER PUBLICATIONS

U.S. Appl. No. 10/654,858 Non-Final Office Action dated Apr. 6, 2007.

(Continued)

*Primary Examiner*—Chi H. Pham
*Assistant Examiner*—Kevin Mew
(74) *Attorney, Agent, or Firm*—Toler Law Group

(57) ABSTRACT

An enhanced data communication node is disclosed. The data communication node can be coupled to a local area network and a wide area network for transferring data traffic between the two networks according to a first protocol, for example, a frame relay protocol. The data communication node includes a network reporting element capable of monitoring management information of an intermediate network coupled into a data communication path to the wide area network. The management information includes service level information of the intermediate network and equipment fault information of a bridging device coupled to the data communication node and the intermediate network. The bridging device encapsulates data according to a second protocol, for example, a Digital Subscriber Line (DSL) protocol. The encapsulating is transparent to the transfer of data between the local area network and the wide area network by the data communication node.

26 Claims, 4 Drawing Sheets

U.S. PATENT DOCUMENTS

| | | |
|---|---|---|
| 6,614,781 B1 | 9/2003 | Elliott et al. |
| 6,631,120 B1 | 10/2003 | Milbrandt |
| 6,631,436 B1 | 10/2003 | Liu et al. |
| 6,636,505 B1 | 10/2003 | Wang et al. |
| 6,704,303 B1* | 3/2004 | Bowman-Amuah .......... 370/352 |
| 6,904,054 B1* | 6/2005 | Baum et al. ................. 370/467 |
| 6,947,416 B1* | 9/2005 | Nee et al. .................... 370/389 |
| 6,963,561 B1* | 11/2005 | Lahat .......................... 370/356 |
| 6,970,924 B1* | 11/2005 | Chu et al. .................... 709/224 |
| 7,065,077 B1* | 6/2006 | Radhakrishnan et al. .... 370/389 |
| 7,099,305 B1 | 8/2006 | Fardid |
| 7,184,427 B1* | 2/2007 | Carew et al. ................ 370/352 |
| 7,194,001 B2* | 3/2007 | Leatherbury et al. ... 370/395.64 |
| 7,203,187 B1* | 4/2007 | Richardson et al. ......... 370/352 |
| 7,274,684 B2* | 9/2007 | Young et al. ................ 370/352 |
| 2002/0024964 A1 | 2/2002 | Baum et al. |
| 2002/0159462 A1* | 10/2002 | Demaria et al. .......... 370/395.1 |
| 2003/0039244 A1* | 2/2003 | Owens et al. ................ 370/389 |
| 2003/0043785 A1* | 3/2003 | Liu et al. ..................... 370/352 |
| 2003/0076815 A1* | 4/2003 | Miller et al. ................. 370/352 |
| 2003/0108063 A1* | 6/2003 | Joseph et al. ................ 370/465 |
| 2003/0193959 A1* | 10/2003 | Lui et al. ..................... 370/401 |
| 2004/0076166 A1* | 4/2004 | Patenaude ................... 370/401 |
| 2004/0111506 A1* | 6/2004 | Kundu et al. ................ 709/223 |
| 2004/0218584 A1* | 11/2004 | Brown ......................... 370/352 |
| 2005/0055431 A1 | 3/2005 | Jones et al. |
| 2005/0089052 A1* | 4/2005 | Chen et al. .................. 370/401 |
| 2005/0226247 A1* | 10/2005 | Brown ...................... 370/395.2 |
| 2006/0098670 A1 | 5/2006 | Voit et al. |
| 2007/0097884 A1 | 5/2007 | Chewning, III et al. |

OTHER PUBLICATIONS

U.S. Appl. No. 10/654,858 Response to Non-Final Office Action dated Apr. 6, 2007 (filed Jul. 3, 2007).
U.S. Appl. No. 10/654,858 Non-Final Office Action dated Dec. 14, 2007.
U.S. Appl. No. 10/654,858 Response to Final Office Action dated Dec. 14, 2007 (filed Mar. 7, 2008).
U.S. Appl. No. 10/654,858 Final Office Action dated May 28, 2008.
U.S. Appl. No. 10/654,858 Response to Non-Final Office Action dated May 28, 2008 (filed Aug. 15, 2008).
Proposed claim Amendments e-mailed to Examiner Oct. 24, 2008.
U.S. Appl. No. 10/654,858 Notice of Allowance mailed Nov. 7, 2008.

* cited by examiner

ENHANCED CSU/DSU (CHANNEL SERVICE UNIT/DATA SERVICE UNIT) FOR FRAME RELAY OVER DSL

CROSS-REFERENCE TO RELATED APPLICATION(S)

The present invention is related to subject matter that is disclosed in U.S. patent application Ser. No. 10/654,858, filed on Sep. 4, 2003 and entitled "ENHANCED NETWORK MANAGEMENT SYSTEM," and incorporated herein by reference in its entirety.

BACKGROUND

1. Field of the Disclosure

The present disclosure relates generally to communication nodes and methods of processing data at such nodes.

2. Description of the Related Art

Communication nodes located between wide area networks and local area data networks have been deployed commercially. An example of a communication node is a channel service unit/data service unit (CSU/DSU). CSU/DSU units that are currently available for deployment receive and forward data traffic between a wide area network and a local area network.

CSU/DSU units communicate data traffic with a wide area network according to a frame relay type protocol. A frame relay type protocol is a packet-switching protocol for connecting devices on a wide area network. CSU/DSU units are often connected directly to a wide area network via asynchronous transfer mode (ATM) equipment. Customer billing is typically based on a guaranteed minimum data throughput and/or a local loop charge.

However, certain system implementations may transfer frame relay communications to an intermediate connection or intermediate network in the communication path to the wide area network. The transfer of data traffic can include data encapsulation according to another protocol. The intermediate transmission and/or encapsulation of the data traffic is often transparent to the CSU/DSU units and the ATM equipment, that is, the CSU/DSU units and ATM equipment are not aware of the transmission and/or encapsulation of the data traffic.

CSU/DSU units can provide various management data, such as performance report data and network management information. However, where CSU/DSU units are not aware of a transparent intermediate connection or network, the CSU/DSU units are not capable of monitoring the transparent connection or network to provide management data and performance reporting. Lack of management data and network management information is problematic when implementing service level agreements (SLA's) where customers are charged based on bandwidth available and/or used on the transparent intermediate connections or networks.

Accordingly, there is a need for an enhanced communication node and method of accessing management data for transparent connections or networks.

BRIEF DESCRIPTION OF THE DRAWINGS

The use of the same reference symbols in different drawings indicates similar or identical items.

DESCRIPTION OF THE EMBODIMENT(S)

An enhanced data communication node is disclosed. The data communication node can be coupled to a local area network and a wide area network for transferring data traffic between the two networks according to a first protocol, for example, a frame relay protocol. The data communication node includes a network reporting element capable of monitoring management information of an intermediate network coupled into a data communication path to the wide area network. The management information includes service level information of the intermediate network and equipment fault information of a bridging device coupled to the data communication node and the intermediate network. The bridging device encapsulates data according to a second protocol, for example, a Digital Subscriber Line (DSL) protocol. The encapsulating is transparent to the transfer of data between the local area network and the wide area network by the data communication node.

In one embodiment, a first data interface is coupled to a first network and a second data interface is coupled to a second network, wherein data traffic is transferred between the second interface and the second network via a third network. The third network is intermediate with respect to the first network and the second network and the second data interface is further coupled to a first external device. The enhanced data communication node also includes a network reporting element configured to monitor equipment fault information of the first external device and to monitor service level information of the third network.

In another embodiment, a method includes sending data packets using a first protocol to a bridging device from a first port of a channel service unit, encapsulating the data packets using the bridging device via a second protocol to generate encapsulated data, wherein the encapsulated data is later de-encapsulated for transmission to a wide area network, and monitoring equipment fault information of the bridging device via the first port of the channel service unit, wherein the encapsulating of the data packets is transparent to the sending of the data packets from the first port of the channel service unit to the wide area network.

Figure 1:
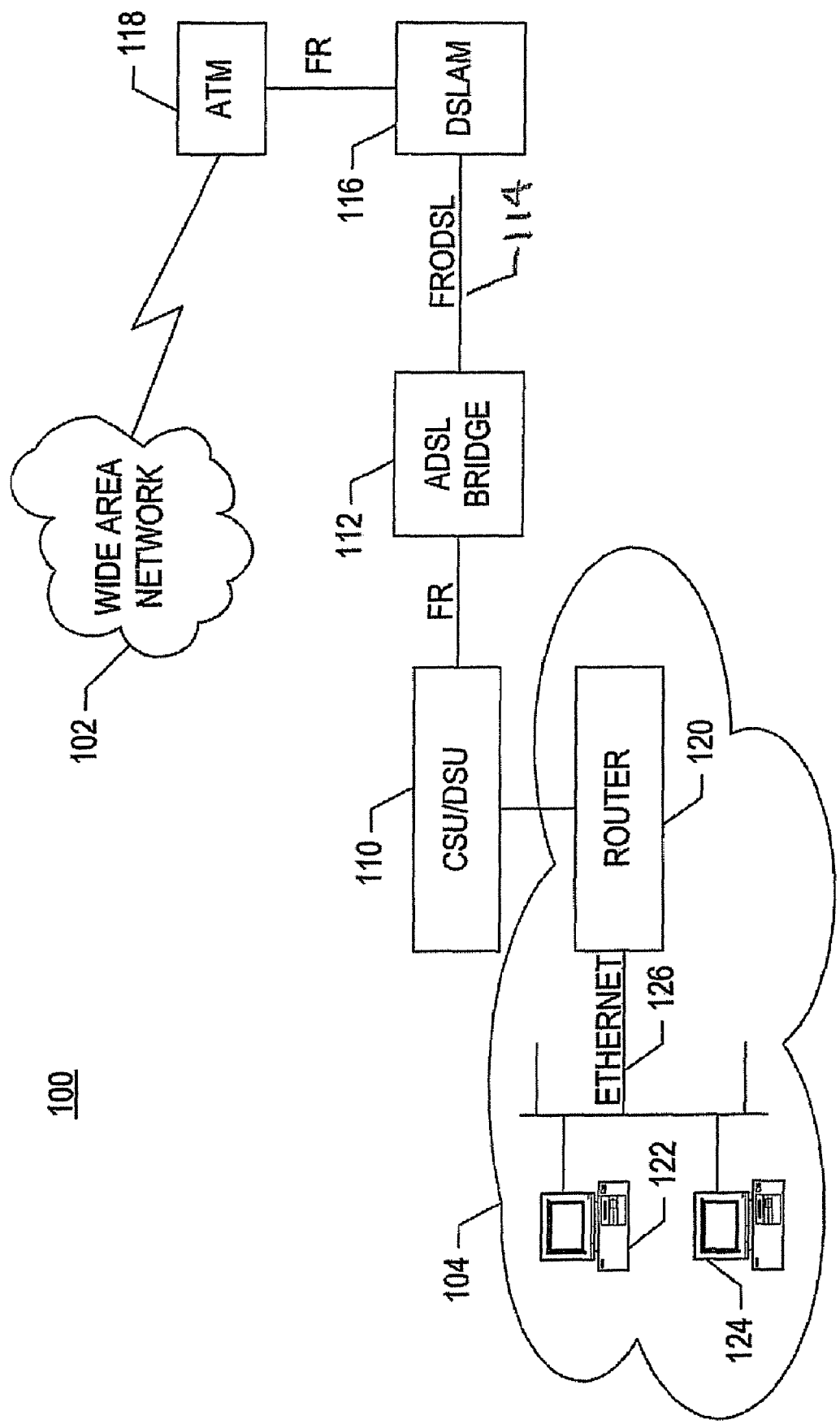
FIG. 1 is a general diagram that illustrates a communication node within a data network according to an embodiment of the present disclosure.

Referring to FIG. 1, a communication system 100 is illustrated according to an embodiment of the present disclosure. The communication system 100 includes a wide area network 102 and a local area network 104. Data traffic is transferred between local area network 104 and wide area network 102 via a channel service unit/data service unit (CSU/DSU) communication node 110. CSU/DSU 110 communicates with wide area network 102 according to a frame relay type protocol. A frame relay type protocol is a packet-switching protocol for connecting devices on a wide area network. Transparent to the communication between CSU/DSU 110 and wide area network 102, a bridging node 112 transfers data traffic to a Digital Subscriber Line (DSL) connection 114 and encapsulates the data traffic according to Frame Relay Over DSL protocol. A Digital Subscriber Line Access Multiplexer (DSLAM) 116 de-encapsulates the data traffic and forwards it to asynchronous transfer mode (ATM) equipment 118. In the other direction, packets sent from wide area network 102 to local area network 104 are encapsulated by DSLAM 116 and de-encapsulated by bridging node 112.

Wide area network 102 can be, for example, the Internet. Local area network 104 can include, for example, a router 120 and various peripheral equipment end terminals 122 and 124 coupled via an Ethernet connection 126. Alternatively, local area network can simply include a modem connected to a home user computer system.

DSL connection 114 is a high speed digital pipeline. By transferring traffic data using DSL connection 114, service costs are reduced and penetration is increased into certain markets that can be economically reached without the added expense of Frame Relay Switches in remote offices.

Customers typically own and operate both CSU/DSU 110 and bridging node 112. In one embodiment, CSU/DSU 110 and bridging node 112 are implemented as a single piece of equipment. A network provider typically owns and operates DSLAM 116 and ATM 118.

Figure 2:
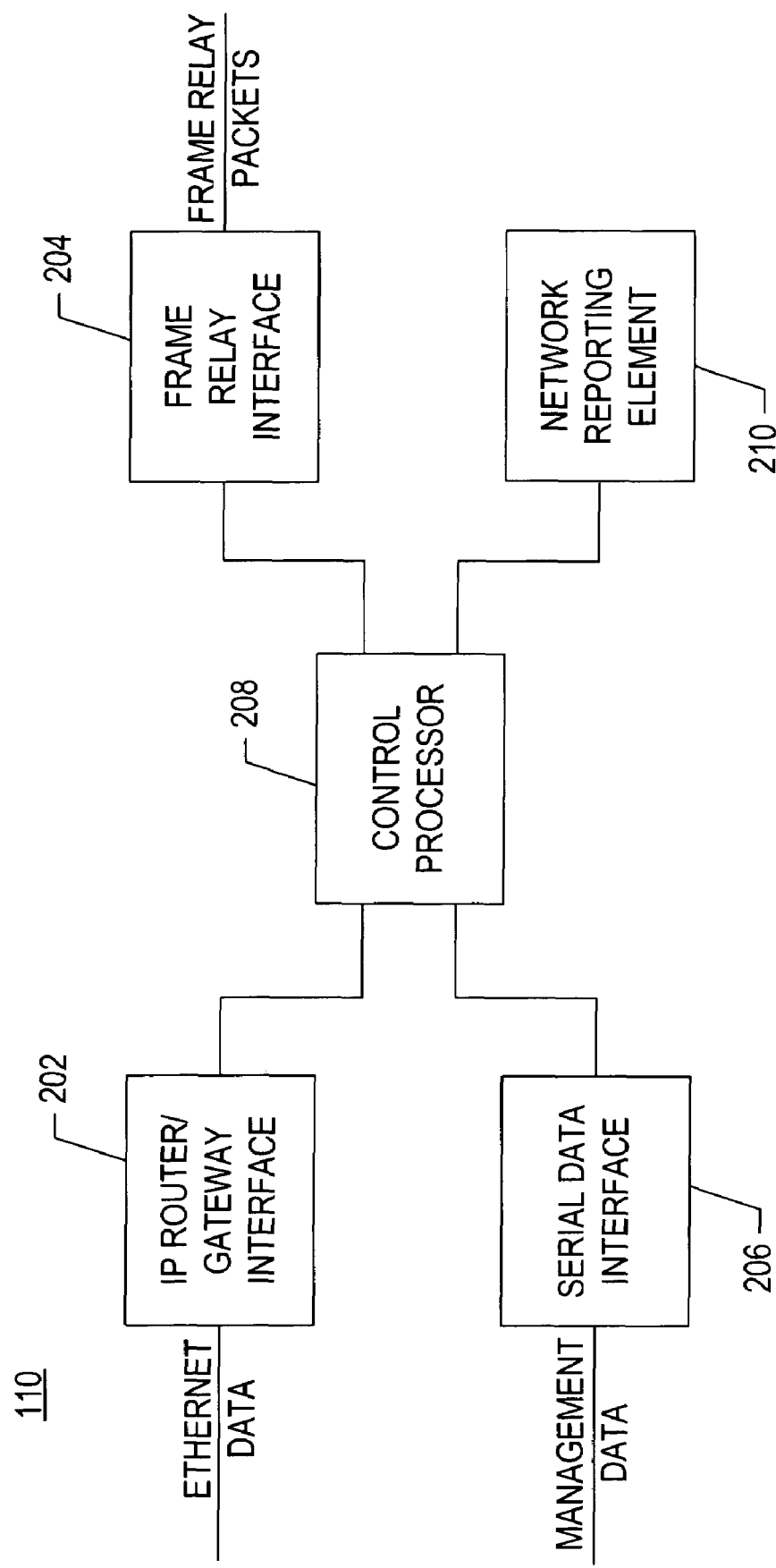
FIG. 2 is a block diagram of an embodiment of the communication node of FIG. 1.

Referring to FIG. 2, a further description of the CSU/DSU 110 is illustrated. The CSU/DSU 110 includes a first data interface, such as an IP router/gateway interface 202 and a second interface, such as a frame relay interface 204. The CSU/DSU 110 communicates to a local area network via IP router/gateway interface 202 according to, for example, an Ethernet protocol. CSU/DSU 110 communicates to a wide area network via frame relay interface 204 according to a frame relay type protocol. CSU/DSU 110 can include a serial data interface 206 for communication of management data. CSU/DSU 110 further includes a control processor 208 and a network reporting element 210. Control processor 208 is coupled to IP router/gateway interface 202, the frame relay interface 204, serial data interface 206, and network reporting element 210.

During operation, the IP router/gateway interface 202 may receive Ethernet data from a local area network and may forward such data to control processor 208. Similarly, the frame relay interface 204 may receive data from a wide area network and forward such data to the control processor 208. Thus, the control processor 208 has access to both local area network data and to wide area network data. The control processor 208, based on various processing of the input data, produces management data and performance data including network management data. The management data may also include measurements related to the input traffic data. However, by simply processing wide area network data received via frame relay interface 204, control processor 208 cannot differentiate management data due to wide area network conditions, transparent connection/network conditions, and bridging equipment conditions.

To address this issue, network reporting element 210 is configured to monitor transparent equipment, such as by monitoring DSL connection 114 for service level information and bridging node 112 for equipment failures. Network reporting element 210 can determine outage errors on DSL connection 114 that may affect a service level agreement. The network reporting element 210 may also differentiate between equipment failure of bridging node 112 and service level or network failure of DSL connection 114. Network reporting element 210 can monitor bridging node 112 and DSL connection 114 utilizing a frame relay virtual circuit (VC) or a Data Link Connection Identifier (DLCI). A VC is a two-way connection between the CSU/DSU 110 and bridging node 112 that sends Simple Network Management Protocol (SNMP) traffic. SNMP is an Internet standard protocol, defined in RFC 1157, developed to manage nodes on an Internet protocol (IP) network. A DLCI is a private or switched virtual circuit in a Frame Relay network that indicates how the data is to be routed.

Network reporting element 210 can be implemented as hardware elements, for example, an integrated circuit or function incorporated into CSU/DSU 110. Alternatively, network reporting element 210 can be a software agent written according to SNMP (see, for example, RFC 1157). Alternatively, network reporting element 210 can be a software agent written according to Common Reliable Accounting for Network Element (CRANE) or some other non-proprietary protocol.

Figure 3:
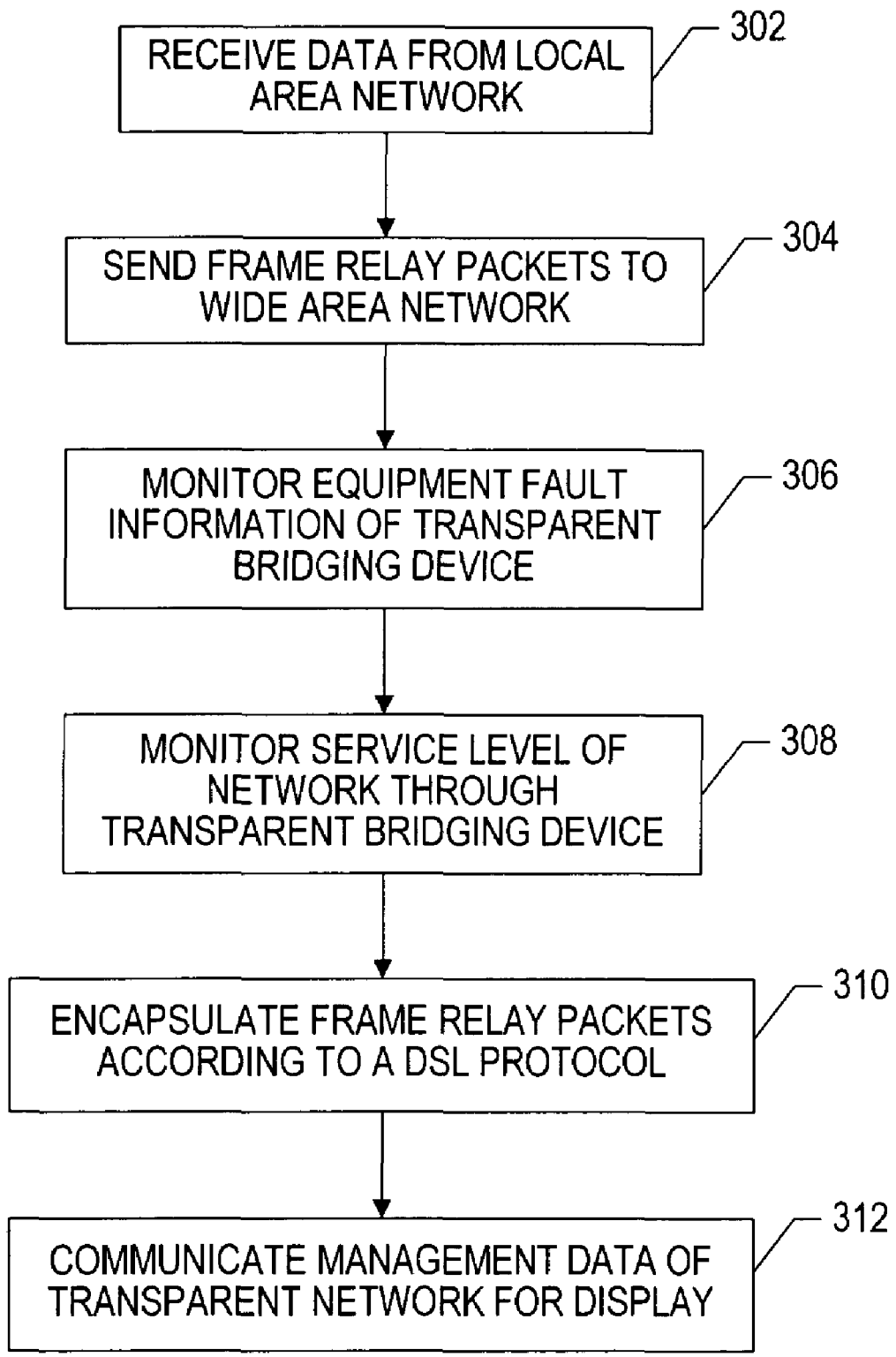
FIG. 3 is a flow chart that illustrates operation of the communication node of FIG. 1.

Referring to FIG. 3, a method of operation is further described with respect to CSU/DSU 110. Data is received from a local area network, at step 302. Frame relay packets are sent to a wide area network via an intermediate transparent network, at step 304. The frame relay packets are sent to a transparent bridging node from a first port of a channel service unit. Equipment fault information of the transparent bridging node of the transparent network is monitored via the first port, at step 306. A service level of the transparent network, such as a DSL connection or ATM node, is monitored through the transparent bridging device via the first port, at step 308. The monitoring of the equipment fault information and the service level information can be according to, for example, Simple Network Management Protocol (SNMP). Frame relay packets are encapsulated by the transparent network according to a protocol, such as Frame Relay Over DSL protocol, at step 310. The encapsulating of the data packets is transparent to the sending of the data packets from the first port of the channel service unit to the wide area network. Management data, such as performance reports, of the transparent network is communicated for display, at step 312.

Figure 4:
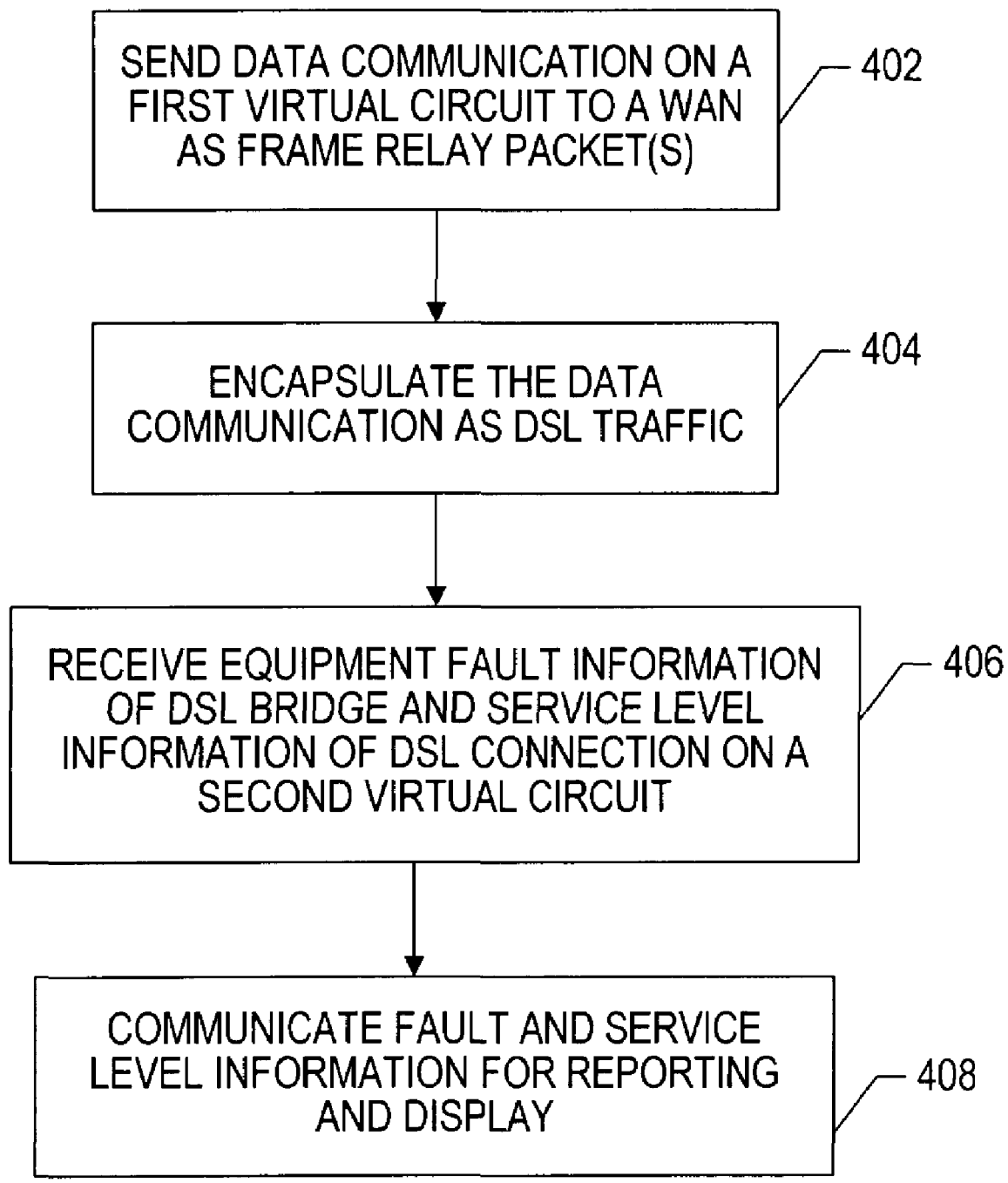
FIG. 4 is a flow chart that illustrates further details as to operation of the communication node of FIG. 1.

Referring to FIG. 4, another method of operation is further described with respect to CSU/DSU 110. A data communication of frame relay packets is sent on a first virtual circuit to a wide area network, at step 402. The data communication is encapsulated as DSL traffic, at step 404. Equipment fault information for a DSL bridge and service level information for a DSL connection is received on a second virtual circuit, at step 406. The equipment fault information and service level information is then communicated for reporting and user display, at step 408.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data communication node for accessing management data of connections and networks comprising:
   a first data interface coupled to a first network;
   a second data interface;
   wherein data traffic is transferred between the second interface and a second network via a transparent third network, the transparent third network intermediate with respect to the first network and the second network;
   wherein the second data interface is further coupled to a transparent bridging device; and
   a network reporting element configured to monitor equipment fault information using the transparent bridging device and to monitor service level information using the transparent third network.

2. The data communication node as recited in claim 1, wherein the first network is a local area network, the second network is a wide area network and the transparent third network includes a Digital Subscriber Line (DSL) connection.

3. The data communication node as recited in claim 1, wherein the data traffic between the first network and the second network is according to a first protocol, and wherein the transparent bridging device encapsulates the data traffic into a second protocol.

4. The data communication node as recited in claim 3, wherein the first protocol is a frame relay type protocol and the second protocol is a Digital Subscriber Line (DSL) protocol.

5. The data communication node as recited in claim 1, wherein the network reporting element is configured to monitor the transparent bridging device for the equipment fault information and to monitor the transparent third network for the service level information using a switched virtual circuit according to a frame relay type protocol.

6. The data communication node of claim 1, wherein the network reporting element is configured to monitor the transparent bridging device for the equipment fault information and the service level information according to Simple Network Management Protocol (SNMP).

7. The data communication node of claim 1, wherein a channel service unit/data service unit includes the first interface and the second interface.

8. The data communication node of claim 1, wherein the network reporting element is implemented as a software agent.

9. A system for accessing management data of connections and networks, the system comprising:
   a data communication node having a first node interface coupled to a local area network and a second node interface, the second node interface configured to transmit data packets according to a first protocol to a wide area network;
   a transparent bridge node having a first bridge interface coupled to the second node interface, the transparent bridge node configured to encapsulate the data packets according to a second protocol forming encapsulated data packets, the transparent bridge node having a second bridge interface coupled to a transparent network connection for transmitting the encapsulated data packets; and
   a network reporting element configured to monitor equipment failures using the transparent bridge node and to monitor service level information using the transparent network connection.

10. The system of claim 9, wherein the first protocol is a frame relay type protocol, the second protocol is Digital Subscriber Line (DSL) protocol and the transparent network connection is a DSL connection.

11. The system of claim 9, wherein the data communication node includes a channel service unit/data service unit.

12. The system of claim 9, wherein the encapsulated data packets are de-encapsulated prior to being sent to the wide area network.

13. A method for accessing management data of connections and networks, the method comprising:
   sending data packets using a first protocol to a transparent bridging device from a first port of a channel service unit;
   encapsulating the data packets using the transparent bridging device via a second protocol to generate encapsulated data, wherein the encapsulated data is later de-encapsulated for transmission to a wide area network; and monitoring equipment fault information using the transparent bridging device via the first port of the channel service unit;
   wherein the encapsulating of the data packets is transparent to the sending of the data packets from the first port of the channel service unit to the wide area network.

14. The method of claim 13, further comprising:
   monitoring service level information of a transparent intermediate network between the channel service unit and the wide area network using the transparent bridging device via the first port.

15. The method of claim 14, wherein the transparent intermediate network includes a Digital Subscriber Line (DSL) connection.

16. The method of claim 14, wherein the equipment fault information and the service level information are monitored according to a Simple Network Management Protocol (SNMP).

17. The method of claim 14, further comprising:
   communicating the equipment fault information and the service level information for display.

18. The method of claim 13, further comprising:
   receiving data from a local area network via a second port; and forming the data packets according to the first protocol.

19. The method of claim 13, wherein the first protocol is a Frame Relay protocol and the second protocol is a Digital Subscriber Line (DSL) protocol.

20. A method for accessing management data of connections and networks, the method comprising:
   sending, from a control processor, a first communication according to a first protocol via a first virtual circuit on a first connection to a wide area network; and
   receiving, at the control processor, a second communication via a second virtual circuit from a transparent external device;
   wherein the second communication includes management information that comprises equipment fault information of the transparent external device and service level information of a transparent network coupled to the transparent external device.

21. The method of claim 20, further comprising:
   encapsulating the first communication in accordance with a second protocol.

22. The method of claim 21, wherein the first protocol is a Frame Relay protocol and the second protocol is a Digital Subscriber Line (DSL) protocol.

23. The method of claim 20, wherein the transparent network coupled to the transparent external device is an intermediate network to the wide area network.

24. The method of claim 20, further comprising:
   communicating the management information for reporting and display from the control processor.

25. A data communication node for accessing management data of connections and a network, the data communication node comprising:
   an interface coupled to a transparent bridge, the interface configured to transmit data packets according to a Frame Relay protocol to a wide area network, the transparent bridge configured to encapsulate the data packets according to a Digital Subscriber Line (DSL) protocol and forward the encapsulated data packets on a transparent DSL connection coupled to the transparent bridge; and
a network reporting element configured to monitor, via the interface, equipment fault information using the transparent bridge and to monitor service level information using the transparent DSL connection.

26. The data communication node as recited in claim 25, wherein encapsulation of the data packets according to the DSL protocol is transparent to transmission of the data packets according to the Frame Relay protocol to the wide area network.

\* \* \* \* \*